(12) United States Patent
Clevenger

(10) Patent No.: US 9,423,976 B2
(45) Date of Patent: Aug. 23, 2016

(54) SYSTEM AND METHOD OF EXPEDITED MESSAGE PROCESSING USING A FIRST-IN-FIRST-OUT TRANSPORT MECHANISM

(71) Applicant: THOMSON LICENSING, Issy de Moulineaux (FR)

(72) Inventor: Brian Duane Clevenger, Muncie, IN (US)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 14/424,283

(22) PCT Filed: Sep. 12, 2013

(86) PCT No.: PCT/US2013/059382
§ 371 (c)(1),
(2) Date: Feb. 26, 2015

(87) PCT Pub. No.: WO2014/043309
PCT Pub. Date: Mar. 20, 2014

(65) Prior Publication Data
US 2015/0248256 A1 Sep. 3, 2015

Related U.S. Application Data

(60) Provisional application No. 61/700,812, filed on Sep. 13, 2012, provisional application No. 61/701,507, filed on Sep. 14, 2012.

(51) Int. Cl.
*G06F 3/06* (2006.01)
*G06F 13/16* (2006.01)
*G06F 13/40* (2006.01)
*H04L 29/08* (2006.01)
*H04L 12/40* (2006.01)
*G06F 9/54* (2006.01)

(52) U.S. Cl.
CPC ............. *G06F 3/0656* (2013.01); *G06F 3/067* (2013.01); *G06F 3/0608* (2013.01); *G06F 9/546* (2013.01); *G06F 13/1642* (2013.01); *G06F 13/4059* (2013.01); *H04L 12/40143* (2013.01); *H04L 67/2842* (2013.01)

(58) Field of Classification Search
None
See application file for complete search history.

(56) References Cited

U.S. PATENT DOCUMENTS

| | | | | |
|---|---|---|---|---|
| 4,682,284 A * | 7/1987 | Schrofer | .......................... | 710/55 |
| 5,832,262 A | 11/1998 | Johnson et al. | | |
| 5,906,658 A * | 5/1999 | Raz | .................. | 710/39 |
| 6,243,781 B1 * | 6/2001 | Gandhi et al. | ................ | 710/313 |
| 6,327,625 B1 * | 12/2001 | Wang et al. | .................. | 709/235 |
| 6,433,787 B1 * | 8/2002 | Murphy | ........................ | 345/556 |
| 6,563,836 B1 | 5/2003 | Capps et al. | | |
| 6,757,768 B1 * | 6/2004 | Potter et al. | .................. | 710/112 |
| 6,832,279 B1 * | 12/2004 | Potter et al. | .................. | 710/112 |
| 6,850,092 B2 * | 2/2005 | Chelcea et al. | ................. | 326/93 |
| 7,626,982 B2 * | 12/2009 | Akadiri | ......................... | 370/362 |
| 8,139,569 B2 * | 3/2012 | Akadiri | ......................... | 370/364 |
| 2003/0088721 A1 * | 5/2003 | Sharma | ......................... | 710/112 |

(Continued)

*Primary Examiner* — Steven Snyder
(74) *Attorney, Agent, or Firm* — Brian J. Dorini; Lily Neff

(57) ABSTRACT

A method and system are provided for processing a reply message out of order from a first-in-first-out (FIFO) storage, and processing other messages in an order as received in the FIFO storage. The system provides a second FIFO storage for storing any messages that have been retrieved from the first FIFO while searching for the reply message.

7 Claims, 3 Drawing Sheets

(56) References Cited

U.S. PATENT DOCUMENTS

| | | |
|---|---|---|
| 2004/0128413 A1* | 7/2004 | Chelcea et al. ............... 710/52 |
| 2004/0151114 A1* | 8/2004 | Ruutu ......................... 370/230 |
| 2008/0130682 A1* | 6/2008 | Akadiri ....................... 370/469 |
| 2010/0030855 A1* | 2/2010 | Akadiri ....................... 709/204 |
| 2014/0115201 A1* | 4/2014 | Fan et al. ..................... 710/53 |

* cited by examiner

SYSTEM AND METHOD OF EXPEDITED MESSAGE PROCESSING USING A FIRST-IN-FIRST-OUT TRANSPORT MECHANISM

CROSS-REFERENCES TO OTHER APPLICATIONS

This application claims the benefit, under 35 U.S.C. §365 of International Application PCT/US2013/059382, filed 12 Sep. 2013, which was published in accordance with PCT Article 21(2) on 20 Mar. 2014 in English, and which claims the benefit of U.S. provisional patent application Nos. 61/700,812 filed 13 Sep. 2012 and 61/701,507 filed 14 Sep. 2012.

TECHNICAL FIELD

This invention relates to a method and system for providing expedited retrieval of one or more messages from a First-In-First-Out (FIFO) storage while keeping other messages to be delivered in the proper FIFO order.

BACKGROUND

Messages exchanged in a communication network may be synchronous or asynchronous. An asynchronous message is a message that is sent without requiring a response from the recipient. A synchronous message is a message that is sent and a reply is expected before processing can continue. During a synchronous message exchange, the reply to the synchronous message must be processed before any other received messages even if other messages are received before the arrival of the reply to the synchronous message.

It is often important to ensure that asynchronous messages are processed in the same order that they were sent. As a result, in a communications network that includes both asynchronous and synchronous message exchanges, it may be necessary to ensure that synchronous message replies can be processed out of order without affecting the ordering of other received messages.

In a network environment or architecture that uses UNIX™ sockets, or more generally, any communication mechanism where received messages are buffered through a first-in first-out (FIFO) buffer, there is no mechanism for expedited access message retrieval or insertion. As a result, messages must be retrieved sequentially from the socket or FIFO buffer until the desired synchronous message reply is retrieved. It is not possible to simply write the undesired (i.e., not the reply message) messages back to the FIFO buffer as this could change the order of the messages in the buffer.

Devices that receive and process messages often need to perform multiple tasks. Therefore, it is beneficial for devices to be notified when messages are available to be read and processed. A simple notification method used in many architectures is to notify when data is available in the transport mechanism's FIFO buffer. For example, in a system using sockets as the transport mechanism, this notification can be provided by a select( ) function as defined by POSIX.1-2001. However, existing solutions that allow out of order reply retrieval from a single FIFO input source either require a more complex notification mechanism or eliminate the notification mechanism entirely, requiring devices to periodically poll for new messages.

SUMMARY OF THE INVENTION

Embodiments of the present principles allow out of order retrieval and processing of response messages (e.g., replies to synchronous messages) in a network environment with a first-in-first-out (FIFO) receiving buffer while ensuring that all other messages are delivered in a FIFO order. Specifically, two FIFO storage locations are provided for storing messages received for processing. After a synchronous message is sent (for which a reply is expected), a message is retrieved from a first FIFO storage and examined as to whether it is the intended reply. If the retrieved message is not the intended reply, and also not a special notification message, the retrieved message is queued in the second FIFO storage.

If the retrieved message is the intended reply, and it is determined that the first FIFO storage is empty but there is at least one message in the second FIFO storage, then a notification message, e.g., a "no operation" (NOOP) message, is written to the first storage. This NOOP message notifies the system that there is at least one message in the second FIFO storage available to be read and processed. The previously queued messages in the second FIFO storage are then read and processed in the same order as initially received in the first FIFO storage.

One embodiment of the present principles provide a method for retrieving and processing messages using a communication link with a first first-in-first-out (FIFO) storage, the method includes retrieving messages from the first FIFO storage; processing a reply message before processing other messages retrieved from the first FIFO storage; and processing the other retrieved messages in an order as received in the first FIFO storage.

Another embodiment provides a system for retrieving message for processing, which includes a message router; a first storage configured for receiving messages from the message router; a message processor configured for retrieving messages from the first storage; the message processor further configured for storing messages to, and retrieving messages from, a second storage, in which both the first storage and the second storage are first-in-first-out (FIFO) storage.

BRIEF DESCRIPTION OF THE DRAWINGS

The teachings of the present invention can be readily understood by considering the following detailed description in conjunction with the accompanying drawings, in which.

DETAILED DESCRIPTION

Figure 1:
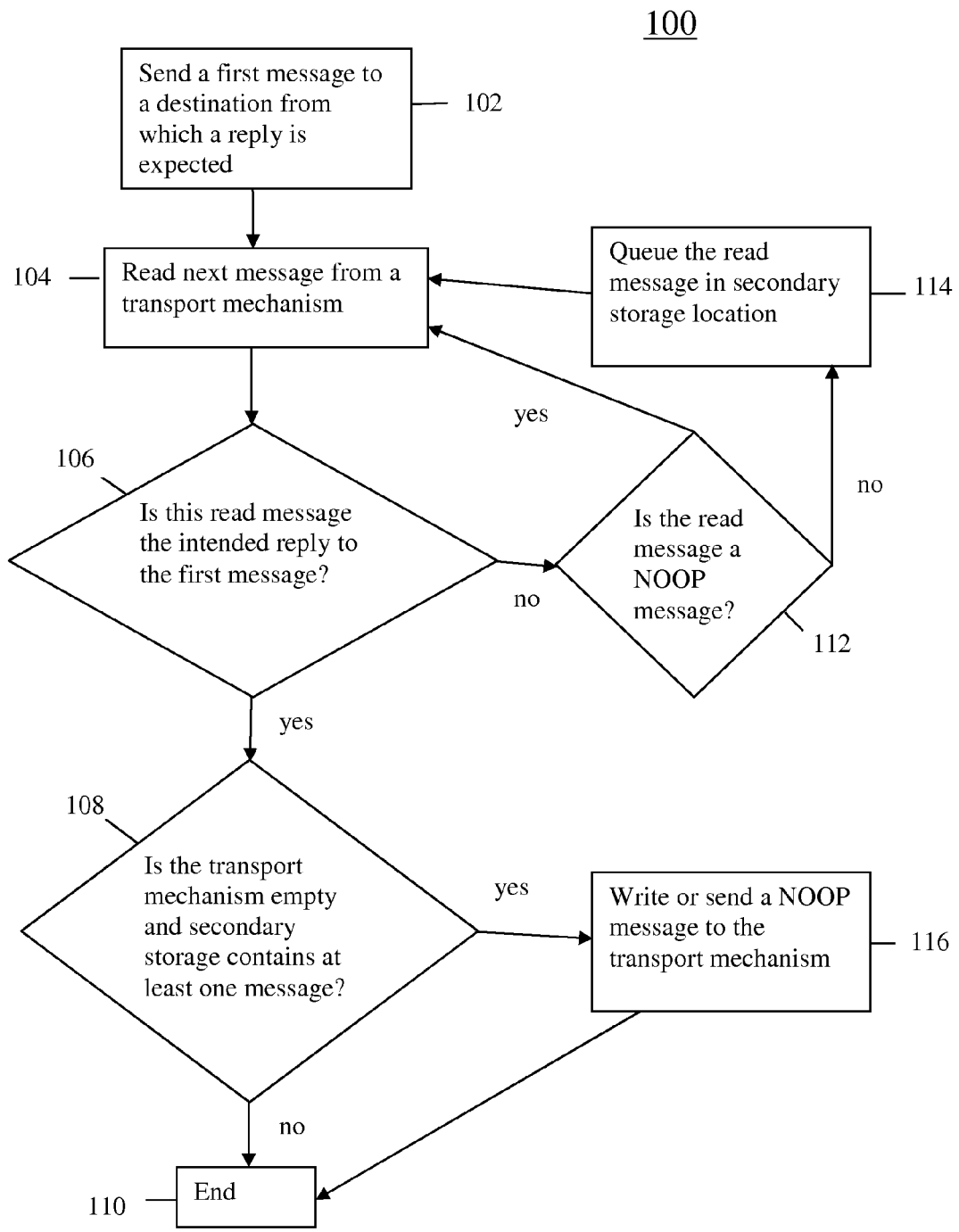
FIG. 1 shows a flow chart of a process for handling messages according to one embodiment of the present principles.

The present principles provide a simple notification for indicating that data or message is available for retrieval while still allowing out of order reply retrieval from a single FIFO input source and ensuring that other messages are delivered in the order they are received.

Embodiments of the present principles are well-suited for implementation in a messaging framework with the following attributes:

1. The ability to send and receive messages for which a reply is expected, and where the reply is to be processed ahead of any other messages that may be waiting to be processed.
2. The messaging framework uses a transport mechanism that does not allow expedited access retrieval or insertion of messages. Instead, it allows only message insertion at the beginning and message retrieval at the end. One example would be a standard network socket, although the present principles would also apply to other transport mechanisms with these characteristics.
3. The device processing messages (i.e., message processor) is notified when messages are available for reading and processing using a simple notification mechanism that indicates the presence of data provided by the transport mechanism.

One aspect of the present principles provides a method of retrieving and processing messages using a communication link or transport mechanism with a first FIFO storage, in which a reply message in a synchronous transaction or message exchange is processed out of order from the first FIFO storage, i.e., processed before processing other messages retrieved from the FIFO storage, and the other retrieved messages are processed in an order as received in the first FIFO storage, without affecting the ordering of these other messages in the messaging framework. Specifically, two storage locations are used for messages that have not yet been processed. The first storage location is the transport mechanism itself, or can be a part of the transport mechanism, for example, a socket buffer. The first storage location only allows insertion at the beginning and retrieval at the end, such as a FIFO queue. No expedited retrieval or insertion is possible. The second storage location can be any storage mechanism (e.g., including hard disk, random access memory, among others) that can be configured or used as a FIFO queue.

In the context of the present principles, processing a message means acting on the message, such as directing to another node or recipient, or performing certain action according to one or more instructions in the specific message, among others. However, retrieving or reading the message from either of the FIFO storages, or writing or directing the message to the second FIFO storage, will not be considered as processing the message.

Furthermore, in the present discussion, retrieving and reading are used in conjunction with each other, and depending on the specific context, may be interchangeable. Reading a message can mean at least reading the message header to determine the type or nature of the message (e.g., whether it is the reply message or a notification message), without requiring the content of the message body to be read.

FIG. 1 depicts a flow chart of a process 100 for handling messages according to one embodiment of the present principles. Specifically, process 100 shows various steps for retrieving and processing messages in a communication system when a first message is sent, for which a reply is expected.

Process 100 starts at block 102, which shows a first message sent from a communication endpoint or node to an intended destination, from which a reply is expected or required, i.e., the first message is a synchronous message. In block 104, messages are retrieved or read one at a time from a first storage, which can be the transport mechanism itself, or a part of the transport mechanism. The message to be retrieved or read from the first storage is the next message in a FIFO queue.

In block 106, a determination is made to see if the read message is intended as a reply to the first message sent in block 102. If the read message is not the intended reply, then the process goes to block 112 to check if it is a notification message, e.g., a NOOP message or a "no operation" message that requires no further action or status change. If so, the process returns to block 104 for retrieving or reading the next message from the first storage.

However, if it is determined (in block 112) that the read message is not a NOOP message, e.g., it requires additional action and/or processing, it is put in a queue and written to a second storage, as shown in block 114. The queue in the second storage is also a FIFO queue.

Referring back to block 106, if the intended reply is retrieved from the first storage (in block 104), it is processed by the message processor 506 (e.g. directing to another node or recipient, or acting on the reply according to one or more instructions, and so on), and message retrieval from the first storage or the transport mechanism stops. In other words, the process will not return to block 104 via block 112 or block 114. Instead, the process proceeds to block 108, where a determination is made as to whether the transport mechanism or the first storage is empty and that the second storage contains at least one message. If the answer is "yes", i.e., the transport mechanism or first storage is empty, but the second storage is not empty, then a single NOOP message is written to the first storage such that it contains at least one message. Process 100 ends at block 110.

However, if the intended reply to the first message has been retrieved (as determined in block 106), but the answer to the inquiry at block 108 is "no" (i.e., at least one of the following is true: the transport storage is not empty, the secondary storage is empty, or both are true), then process 100 also ends at block 110.

Normal operation, e.g., retrieving or reading and processing of other messages, including asynchronous and synchronous messages, resumes upon the end of process 100. This method of retrieving and processing messages ensures that a reply message is processed before processing other messages that are also present and pending processing in the first FIFO, and before normal operation is resumed. Note that after a first synchronous message has been sent by a message processor in an endpoint (block 102), a second synchronous message cannot be sent by the same endpoint until the reply to the first message is received and processed. Asynchronous messages, however, can still be sent during the time when the processor is searching for the reply to the synchronous message.

During normal operation, i.e., when the endpoint or node is not waiting for a reply to a previously sent message, the message processor at the endpoint waits until it receives a notification signal that the transport mechanism (or first storage) contains at least one message. The application reads messages from the second storage location until it is empty, and then reads messages from the first storage until it is empty. When a special NOOP message described in block 116 is read from the first storage, the NOOP message is dropped or discarded without delivering it to the user, and the next message (if any) is read from the first storage.

Although the above discussions mention certain specific features, such as the use of sockets, other more generic or general implementations are also acceptable. Thus, various aspects of the present principles are further illustrated and discussed in FIGS. 2-5 below.

Figure 2:
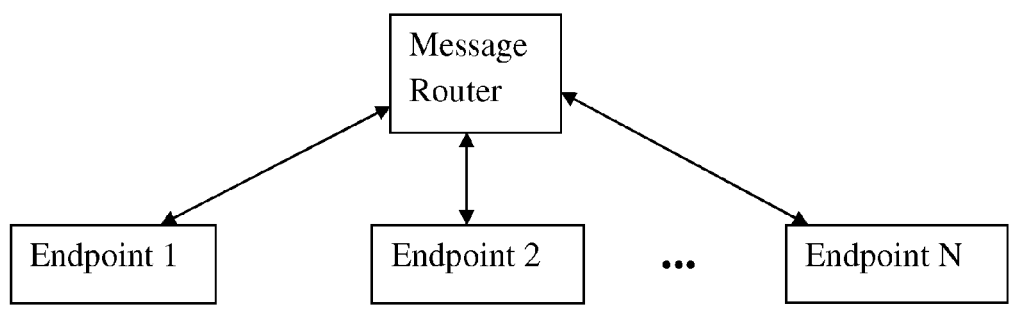
FIG. 2 shows a diagram of a network topology, which can be used for implementing the process of FIG. 1.

FIG. 2 shows a diagram of a network topology that can be used for implementing the process 100 of FIG. 1. The network includes two or more endpoints or nodes and a message router used for passing messages between endpoints. The message router is coupled to each endpoint via a bi-directional communication path. As used herein, an endpoint can refer to a physical component such as a mobile device, and can also be a software application or process. In one embodiment, the endpoints are processes on the same device, and communications can occur among multiple software applications residing on the same physical device. Alternatively, each endpoint can also be a separate device.

Figure 3:
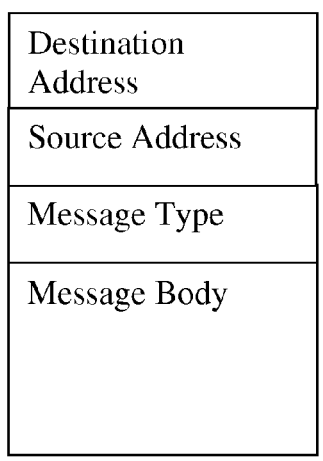
FIG. 3 shows an exemplary message consisting of a destination address, a source address, a message type, and a message body.

FIG. 3 shows an exemplary message with a destination address, a source address, a message type, and a message body. Endpoints send messages to the message router. The message router then examines the destination address in the message and forwards the message to an endpoint or intended recipient based on the destination address.

Figure 4:
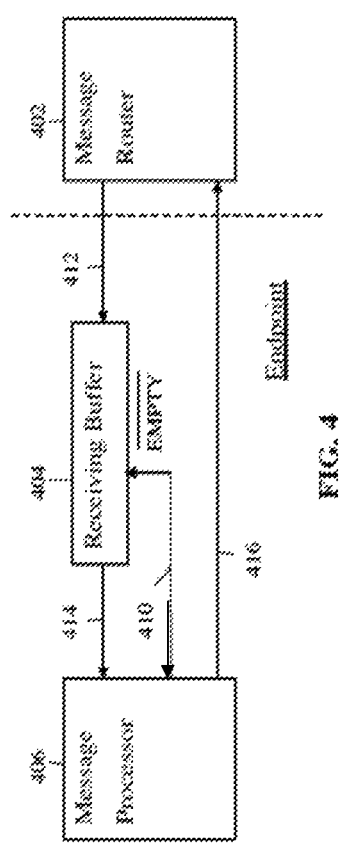
FIG. 4 shows an existing messaging framework inside an endpoint.
Figure 5:
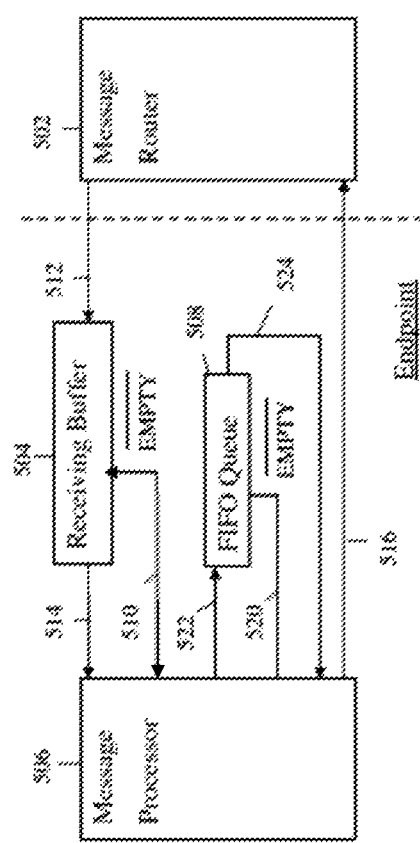
FIG. 5 shows one embodiment of the present invention with a modified endpoint.

The messaging framework inside an endpoint of FIG. 2 is further discussed with respect to FIGS. 4-5.

FIG. 4 shows an existing messaging framework inside each endpoint of FIG. 2, with arrows indicating the connections and directions of message flow between corresponding components. All messages sent from a message router 402 to an endpoint go into a receiving buffer 404, as shown by arrow 412. The receiving buffer 404 is a first-in-first out (FIFO) buffer, which, in one configuration, is provided by a UNIX™ socket. The receiving buffer 404 is also coupled to a message processor 406, and provides an indication or signal 410 to the processor 406 when the receiving buffer 404 is not empty. The signal or notification of the status of the buffer can be implemented in different manners, using hardware or software, as appropriate.

When a message router 402 transmits a message into an endpoint's receiving buffer 404, the message processor 406 is notified by the receiving buffer 404 that it is no longer empty. This notification 410 causes the message processor 406 to retrieve the next message from the receiving buffer 404 (shown by arrow 414) and perform any necessary processing.

When an endpoint wants to send a message, the message processor 406 constructs the message and sends it to the message router 402 (shown by arrow 416). The message router 402 then sends the message to the intended destination based on the destination address in the message.

With this messaging framework, however, a problem can arise when the message processor 406 needs to send a message and wait for a reply (e.g., when a reply is expected or required in a synchronous message exchange or transaction). This messaging framework provides no mechanism for out of order retrieval of messages from the receiving buffer 404. The only way to process a synchronous message reply before processing other messages with this architecture is to read messages sequentially from the receiving buffer 404 and to transmit any undesired messages (i.e., those that are not the reply message) back to the message router 402, which then inserts them again in the receiving buffer 404.

This procedure ensures that other messages (not the reply to the endpoint) are not lost, but it creates a lot of unnecessary traffic through the message router 402 and also has the potential to change the order of these messages with respect to others that may have arrived in the receiving buffer 404 before these read messages are put back at the end of the receiving buffer queue.

FIG. 5 shows one embodiment of a messaging framework according to the present principles, in which the design within the endpoint is modified to solve the problem described above in FIG. 4. Specifically, a FIFO queue 508 is provided for storing messages retrieved from the receiving buffer 404 (also a FIFO queue) during a time period when the message processor 506 is looking or searching for the intended reply to a synchronous message previously sent by the endpoint. In this example, the receiving buffer 504 corresponds to the first storage or transport mechanism (or part of the mechanism) described in connection with FIG. 1, and the FIFO queue 508 corresponds to, or is located at, the second storage described in connection with FIG. 1. In one embodiment, the receiving buffer or first storage 504 is a buffer provided by a UNIX™ socket, and the FIFO queue or second storage 508 is implemented with a linked list data structure. Depending on the specific application, however, other implementations are also acceptable. For example, the first storage 504 can also be a dedicated hardware device, such as a FIFO implemented in a field-programmable gate array (FPGA) or application specific integrated circuit (ASIC), among others. Alternatively, it can also be part of a larger hardware device, for example, a transceiver that provides some FIFO buffering of received messages. The second storage 508 can be any storage mechanism that can be used as a FIFO buffer, including, for example, a hard disk or other dedicated hardware device like a FIFO implemented in an FPGA or an ASIC.

As shown in FIG. 5 a receiving buffer or first storage 504 is coupled to the message router 502 and a message processor 506. Messages sent from the router 502 to the endpoint go into the first storage 504, as shown by arrow 512. The message processor 506 is configured for receiving a non-empty status indicator or signal 510, as well as receiving messages from the first storage 504, as shown by arrow 514. In one embodiment, the first storage 504 sends a signal 510 to the processor 506 when there is at least one message in the storage 504, to wake up or notify the processor 506 to start retrieving and processing messages.

The message processor 506 is also coupled to the second storage 508, which is configured for receiving messages from the processor 506 (arrow 522), providing a signal 520 to indicate a non-empty status, and providing messages to the processor 506 (arrow 524).

Unlike signal 510, signal 520 is not sent by the second storage 508 as a notification to wake up the processor 506. Instead, the message processor 506 simply reads the state of this signal at step 108 (in process 100 of FIG. 1) to determine if the second storage 508 is empty or not empty. It also reads the state during normal operation to determine if there are any more messages that need to be read from storage 508, before starting to read messages from the first storage 504.

As an example, if all the blocks in FIG. 5 are discrete hardware devices, signals 510 and 520 may present a low logic level when empty and a high logic level if not empty. Signal 510 can be connected to an IRQ input (i.e., interrupt request) on processor 506 because it needs to be notified when the receiving buffer or first storage 504 transitions from not empty to empty. Signal 520 can be connected to a GPIO (general purpose input-output) input on processor 506 because it only needs to be able to read the state, but not be notified of changes in the empty or not empty status of storage 508.

In a situation when all of the blocks in FIG. 5 are implemented in software, the logical behavior is the same as described above for hardware implementation.

Sending asynchronous messages from the endpoint behaves the same as in FIG. 4, but receiving messages is different. During normal operation of receiving messages (i.e., when the message processor 506 is not expecting or waiting for a reply to a previously sent message), messages are read first from the second storage 508 until it is empty. After reading all messages from the second storage 508, the message processor starts reading messages from the first storage 504. If the message processor 506 retrieves a NOOP message (as indicated by the message type field in the message), the message processor discards the message without processing it and retrieves the next available message from the first storage 504. The purpose of providing a NOOP message in the first storage 504 (corresponding to writing a NOOP message to the transport mechanism in block 116 of FIG. 1) is further explained below.

When the message processor 506 wants to send a message and wait for a reply, it sends the message to the message router 502. In this situation, the message processor 506 provides a special function that is effectively "send message and get reply". No other normal message processing occurs when a "send and get reply" operation is in progress. At that point, the message processor 506 begins retrieving or reading messages from the receiving buffer or first storage 504 (i.e., any old messages that might still be in the FIFO queue or second storage 508 is ignored) until it receives the reply message. Any messages it receives from the receiving buffer 504 (corresponding to the transport mechanism in FIG. 1) that are not the reply message and not a NOOP message are written to or stored in the second storage 508. After the reply message is retrieved from the first storage 504, if the first storage is empty and the second storage 508 is not empty (i.e., answer "yes" to block 108 in FIG. 1), then the message processor 506 constructs and sends a single NOOP message to the message router 502 with the message processor's own address set as the destination address. This causes the message router 502 to write or send the NOOP message to the first storage 504 (e.g., as in block 116 of FIG. 1).

The presence of the NOOP message in the receiving buffer or first storage 504 simplifies the logic that is required for determining if messages are available to be read or retrieved for processing. As previously mentioned, during normal operation, all messages are retrieved from the second storage 508 for processing, before messages from first storage are read or retrieved. Thus, if the first storage 504 is empty, second storage 508 must also be empty. This allows the system to only rely on signal 510 to wake up the message processor 506 to start reading and processing messages. Instead of requiring an aggregated status from both the receiving buffer 504 and the FIFO queue 508 to determine if messages are available for reading and processing, the presence of the NOOP message makes it possible to only rely on the status provided by the receiving buffer 504 (via signal 510) to determine if messages are available for reading and processing. Although the above discussion uses a NOOP message as a notification message, it is possible that a different type of message can also serve as a notification message under appropriate situations.

Having a simple notification system to indicate when messages are available for reading and processing is desirable for systems that perform other operations in addition to message reading and processing on shared hardware. The shared hardware resources can be used for other purposes until messages are available. When messages are available for reading and processing (as indicated by the not empty status provided by the receiving buffer 504), other processing elements can release the shared hardware resources to the message processor to allow the available messages to be read and processed. When message reading and processing is complete (as indicated by the receiving buffer 504 indicating it is empty), the shared hardware resources can again be used for purposes other than message reading and processing. This simplifies the design of other processing elements as these elements do not need to be aware of the existence of the FIFO queue 508 used by the message processor. The other processing elements can rely solely on the empty status provided by the receiving buffer 504 to determine when messages are available for reading and processing.

In the example of FIG. 5, the notification from the receiving buffer 504 that it is no longer empty can be implemented either in a pure hardware implementation, for example, as an interrupt line between the receiving buffer 504 and the processor 506. Alternatively, it can also be implemented in software, e.g., using a select( ) call to block until the buffer has data.

According to another aspect of the present principles, a non-transitory computer readable medium (e.g., memory, storage device, removable media, and so on) is provided with stored program instructions, which, when executed by a processor, will cause a method to be implemented such as described above according to one or more embodiments of the present principles, e.g., a method or variations discussed in connection with FIG. 1.

While the foregoing is directed to various embodiments of the present invention, other embodiments of the invention may be devised without departing from the basic scope thereof. For example, one or more features described in the examples above can be modified, omitted and/or used in different combinations. Thus, the appropriate scope of the invention is to be determined according to the claims that follow.

The invention claimed is:

1. A method for retrieving and processing messages using a communication link with a first first-in-first-out (FIFO) storage, comprising:
   (a) retrieving a message from the first FIFO storage;
   (b) adding the retrieved message to a second FIFO storage if the retrieved message is not a reply message and not a notification message;
   (c) discarding the retrieved message if the retrieved message is a notification message,
   (d) processing the reply message before processing any other messages retrieved from the first FIFO storage,
   (e) processing the other retrieved messages in an order as received in the first FIFO storage,
   (f) repeating steps (a) to (c) until the reply message is retrieved
   (g) upon retrieving the reply message, and determining that the first FIFO storage is empty and the second FIFO storage contains at least one message, sending a notification message to the first FIFO storage; and
   (h) resuming retrieving and processing of the other messages after sending the notification message.

2. The method of claim 1, wherein upon retrieving the reply message, and upon determining at least one of: the first FIFO storage at least one message, and the second FIFO storage being empty, resuming retrieving and processing of the other messages.

3. A system for retrieving messages for processing, comprising:
   a message router;
   a first storage configured for receiving messages from the message router;
   a message processor configured for retrieving messages from the first storage; the message processor further configured for storing messages to, and retrieving messages from, a second storage, wherein both the first storage and the second storage are first-in-first-out (FIFO) storage; wherein the message processor is configured for retrieving at least one message from the first storage to determine if the at least one message is a reply to a previously sent synchronous message, and if the at least one message is not the reply and not a notification message, then storing the at least one message in the second storage for subsequent retrieval and processing.

4. The system according to claim 3, wherein the message processor is further configured for sending a notification message to the first storage upon retrieving the reply and upon determining that the first storage is empty and the second storage is not empty.

5. The system according to claim 3, wherein the message processor is further configured for discarding the at least one message retrieved from the first storage if the at least one message is the notification message.

6. The system according to claim 3, wherein all messages stored in the second storage are messages that have been retrieved from the first storage by the message processor during a time period when the message processor is searching for the reply to the previously sent synchronous message.

7. The system of claim 3, wherein the first FIFO storage is further configured to provide a signal to the message processor to notify that other messages are ready to be retrieved from either of the first FIFO storage and the FIFO storage.

* * * * *